(12) United States Patent
Beaumont (10) Patent No.: US 7,454,451 B2
(45) Date of Patent: Nov. 18, 2008

(54) METHOD FOR FINDING LOCAL EXTREMA OF A SET OF VALUES FOR A PARALLEL PROCESSING ELEMENT

(75) Inventor: Mark Beaumont, Reading (GB)

(73) Assignee: Micron Technology, Inc., Boise, ID (US)

( * ) Notice: Subject to any disclaimer, the term of this patent is extended or adjusted under 35 U.S.C. 154(b) by 694 days.

(21) Appl. No.: 10/689,335

(22) Filed: Oct. 20, 2003

(65) Prior Publication Data

US 2004/0215678 A1    Oct. 28, 2004

(30) Foreign Application Priority Data

Apr. 23, 2003    (GB) ................. 0309207.9

(51) Int. Cl.
G06F 7/00    (2006.01)

(52) U.S. Cl. .................................... 708/207

(58) Field of Classification Search ................. 708/207
See application file for complete search history.

(56) References Cited

U.S. PATENT DOCUMENTS

| | | | |
|---|---|---|---|
| 4,410,960 A * | 10/1983 | Kasuya ................. | 712/300 |
| 5,122,979 A | 6/1992 | Culverhouse | |
| 5,241,677 A | 8/1993 | Naganuma et al. | |
| 5,262,969 A | 11/1993 | Ishihara | |
| 5,535,387 A | 7/1996 | Matsouka et al. | |
| 5,581,773 A | 12/1996 | Glover | |
| 5,630,129 A | 5/1997 | Wheat | |
| 5,737,251 A | 4/1998 | Kohno et al. | |
| 5,850,489 A | 12/1998 | Rich | |
| 5,892,517 A | 4/1999 | Rich | |
| 5,966,528 A | 10/1999 | Wilkinson et al. | |
| 5,991,785 A | 11/1999 | Alidina et al. | |
| 6,029,244 A | 2/2000 | Oberman et al. | |

(Continued)

FOREIGN PATENT DOCUMENTS

EP    0404012 A3    12/1990

(Continued)

OTHER PUBLICATIONS

Daehyun Kim, Mainak Chaudhuri, and Mark Heinrich, Leveraging Cache Coherence in Active Memory Systems, Proceedings of the 16th ACM Int'l Conference on Supercomputing, pp. 2-13, New York City, USA, Jun. 2002.

(Continued)

*Primary Examiner*—Tan V Mai
(74) *Attorney, Agent, or Firm*—Jones Day; Edward L. Pencoske (57) ABSTRACT

A method for finding a local extrema for a single processing element having a set of values associated therewith includes separating the set of values into an odd set of values and an even set of values, determining a first extrema from the odd set of values, determining a second extrema from the even set of values, and determining the local extrema from the first extrema and the second extrema. The first extrema is found by comparing each odd-numbered value in the set to each other odd-numbered value in the set and the second extrema is found by comparing each even-numbered value in the set to each other even-numbered value in the set.

19 Claims, 5 Drawing Sheets

U.S. PATENT DOCUMENTS

| | | | |
|---|---|---|---|
| 6,078,945 | A | 6/2000 | Hinsley |
| 6,219,776 | B1 | 4/2001 | Pechanek et al. |
| 6,279,088 | B1 | 8/2001 | Elliot et al. |
| 6,292,822 | B1 | 9/2001 | Hardwick |
| 6,404,439 | B1 | 6/2002 | Coulombe et al. |
| 6,421,772 | B1 | 7/2002 | Maeda et al. |
| 6,430,618 | B1 | 8/2002 | Karger et al. |
| 6,948,056 | B1 * | 9/2005 | Roth et al. ................. 712/300 |
| 2002/0116425 | A1 * | 8/2002 | Imai ........................... 708/207 |

FOREIGN PATENT DOCUMENTS

| | | |
|---|---|---|
| JP | 7-064766 A | 3/1993 |
| SU | 1546960 A | 2/1990 |
| WO | WO 91/19259 A1 | 12/1991 |
| WO | WO 1999/019791 | 4/1999 |
| WO | WO 01/67238 A1 | 11/2001 |

OTHER PUBLICATIONS

Mainak Chaudhuri, Daehyun Kim, and Mark Heinrich, Cache Coherence Protocol Design for Active Memory Systems, Proceedings of the 2002 Int'l Conference on Parallel and Distributed Processing Techniques and Applications, pp. 83-89, Las Vegas, USA, Jun. 2002.

* cited by examiner

METHOD FOR FINDING LOCAL EXTREMA OF A SET OF VALUES FOR A PARALLEL PROCESSING ELEMENT

CROSS-REFERENCE TO RELATED APPLICATIONS

The present application is related to U.S. patent application Ser. No. 10/689,256 entitled "Method for Finding Global Extrema of a Set of Bytes Distributed Across an Array of Parallel Processing Elements" filed 20 Oct. 2003, and U.S. patent application Ser. No. 10/689,449 entitled "Method for Finding Global Extrema of a Set of Shorts Distributed Across an Array of Parallel Processing Elements" filed 20 Oct. 2003.

BACKGROUND OF THE INVENTION

The present invention relates generally to parallel processing and more particularly to determining an extrema (e.g., maximum or minimum) from a set of values within a single processing element of a parallel processing system.

Conventional central processing units ("CPU's"), such as those found in most personal computers, execute a single program (or instruction stream) and operate on a single stream of data. For example, the CPU fetches its program and data from a random access memory ("RAM"), manipulates the data in accordance with the program instructions, and writes the results back sequentially. There is a single stream of instructions and a single stream of data (note: a single operation may operate on more than one data item, as in X=Y+Z, however, only a single stream of results is produced). Although the CPU may determine the sequence of instructions executed in the program itself, only one operation can be completed at a time. Because conventional CPUs execute a single program (or instruction stream) and operate on a single stream of data, conventional CPUs may be referred to as a single-instruction, single data CPU or an SISD CPU.

The speed of conventional CPUs has dramatically increased in recent years. Additionally, the use of cache memories enables conventional CPUs faster access to the desired instruction and data streams. However because conventional CPUs can complete only one operation at a time, conventional CPUs are not suitable for extremely demanding applications having large data sets (such as moving image processing, high quality speech recognition, and analytical modeling applications, among others).

Improved performance over conventional SISD CPUs may be achieved by building systems which exhibit parallel processing capability. Typically, parallel processing systems use multiple processing units or processing elements to simultaneously perform one or more tasks on one or more data streams. For example in one class of parallel processing system, the results of an operation from a first CPU are passed to a second CPU for additional processing, and from the second CPU to another CPU, and so on. Such a system, commonly known as a "pipeline", is referred to as a multiple-instruction, single-data or MISD system because each CPU receives a different instruction stream while operating on a single data stream. Improved performance may also be obtained by using a system which contains many autonomous processors, each running its own program (even if the program running on the processors is the same code) and producing multiple data streams. Systems in this class are referred to as a multiple-instruction, multiple-data or MIMD system.

Additionally, improved performance may be obtained using a system which has multiple identical processing units each performing the same operations at once on different data streams. The processing units may be under the control of a single sequencer running a single program. Systems in this class are referred to as a single-instruction, multiple data or SIMD system. When the number of processing units in this type of system is very large (e.g., hundreds or thousands), the system may be referred to as a massively parallel SIMD system.

Nearly all computer systems now exhibit some aspect of one or more of these types of parallelism. For example, MMX extensions are SIMD; multiple processors (graphics processors, etc) are MIMD; pipelining (especially in graphics accelerators) is MISD. Furthermore, techniques such as out of order execution and multiple execution units have been used to introduce parallelism within conventional CPUs as well.

Parallel processing is also used in active memory applications. An active memory refers to a memory device having a processing resource distributed throughout the memory structure. The processing resource is most often partitioned into many similar processing elements (PEs) and is typically a highly parallel computer system. By distributing the processing resource throughout the memory system, an active memory is able to exploit the very high data bandwidths available inside a memory system. Another advantage of active memory is that data can be processed "on-chip" without the need to transmit the data across a system bus to the CPU or other system resource. Thus, the work load of the CPU may be reduced to operating system tasks, such as scheduling processes and allocating system resources.

A typical active memory includes a number of interconnected PEs which are capable of simultaneously executing instructions sent from a central sequencer or control unit. The PEs may be connected in a variety of different arrangements depending on the design requirements for the active memory. For example, PEs may be arranged in hypercubes, butterfly networks, one-dimensional strings/loops, and two-dimensional meshes, among others.

A typical PE may contain data, for example a set of values, stored in one or more registers. In some instances, it may be desirable to determine the extrema (e.g., the highest or lowest value) of the set of values. Conventional methods for finding the extrema, however, often results in a number processing cycles being "lost." A lost cycle may refer to, for example, a cycle in which the PE must wait to complete a calculation because the necessary data has yet to be transferred into or out of the PE.

Thus, there exists a need for a method for determining the extrema of a set of values on a parallel processor such that the resources of the parallel processing system are maximized. More specifically, there exists a need for a method for determining the extrema of a set of values on a parallel processing element of an active memory such that the resources of the active memory are maximized.

SUMMARY OF THE INVENTION

One aspect of the present invention relates to a method for finding a local extrema for a processing element having a set of values associated therewith. The method comprises separating the set of values into an odd numbered set and an even numbered set, determining an odd extrema from the odd numbered set, determining an even extrema from the even numbered set, and determining the local extrema from the odd extrema and the even extrema.

The method may further include loading a value from an odd position within the set into a first register, loading a value from an even position within the set into a second register and transferring the value in the first register to a third register, loading a value from a next odd position within the set into the first register and transferring the value in the second register to a fourth register, and loading a value from a next even position within the set into the second register.

The present invention enables the extrema of a set of values to be determined while maximizing the resources of a PE. The present invention may be performed using the hardware and software (i.e., the local processing capability) of each PE within the array. Those advantages and benefits, and others, will become apparent from description of the invention below.

BRIEF DESCRIPTION OF THE DRAWINGS

To enable the present invention to be easily understood and readily practiced, the present invention will now be described for purposes of illustration and not limitation, in connection with the following figures wherein.

DETAILED DESCRIPTION OF THE INVENTION

As discussed above, parallel processing systems may be placed within one or more classifications (e.g., MISD, MIMD, SIMD, etc.). For simplicity, the present invention is discussed in the context of a SIMD parallel processing system. More specifically, the present invention is discussed in the context of a SIMD active memory. It should be noted that such discussion is for clarity only and is not intended to the limit the scope of the present invention in any way. The present invention may be used for other types and classifications of parallel processing systems.

Figure 1:
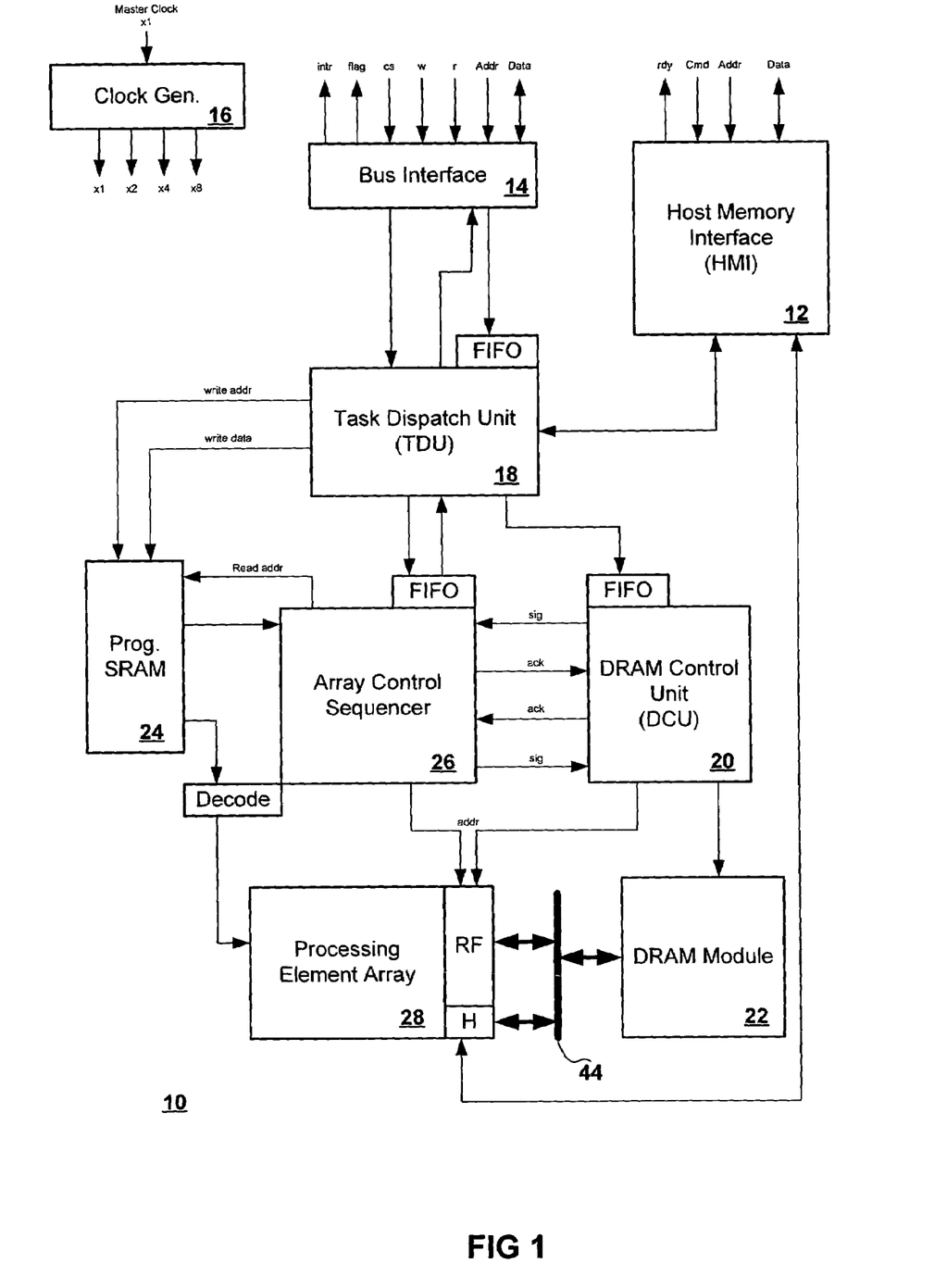
FIG. 1 is a block diagram illustrating an active memory according to an embodiment of the present invention.

FIG. 1 is a block diagram illustrating an active memory 10 according to an embodiment of the present invention. It should be noted that the active memory 10 is only one example of a device on which the methods of the present invention may be practiced and those of ordinary skill in the art will recognize that the block diagram of FIG. 1 is an overview of an active memory device 10 with a number of components known in the art being omitted for purposes of clarity.

Active memory 10 is intended to be one component in a computer system. Processing within active memory 10 is initiated when the active memory 10 receives commands from a host processor (not shown), such as the computer system's CPU. A complete processing operation (i.e., data movement and processing) in the active memory 10 may consist of a sequence of many commands from the host to the active memory device 10.

Active memory 10 is comprised of a host memory interface ("HMI") 12, a bus interface 14, a clock generator 16, a task dispatch unit ("TDU") 18, a DRAM control unit ("DCU") 20, a DRAM module 22, a programmable SRAM 24, an array control sequencer 26, and a processing element array 28, among others.

The HMI 12 provides an input/output channel between the host (such as a CPU, not shown) and the DRAM module 22. In the current embodiment, the HMI 12 receives command (cmd), address (addr), and data signals (among others) from and sends data and ready (rdy) signals (among others) to the host. The HMI 12 approximates the operation of a standard non-active memory so that the host, without modifications, is compatible with the active memory 10.

The HMI 12 may be similar in its operation to the interface of a synchronous DRAM as is know in the art. Accordingly, the host must first activate a page of data to access data within a DRAM module 22. In the current embodiment, each page may contain 1024 bytes of data and there may be 16,384 pages in all. Once a page has been activated, it can be written and read through the HMI 12. The data in the DRAM module 22 may be updated when the page is deactivated. The HMI 12 also sends control signals (among others) to the DCU 20 and to the processing element array 28 via the task dispatch unit 18.

The HMI 12 may operate at a frequency different than that of the frequency of the master clock. For example, a 2×internal clock signal from clock generator 16 may be used. Unlike a traditional DRAM, the access time for the HMI 12 uses a variable number of cycles to complete an internal operation, such as an activate or deactivate. Thus the ready signal (rdy) is provided to allow the host to detect when a specific command has been completed.

The bus interface 14 provides an input/output channel between the host and the TDU 18. For example, the bus interface 14 receives column select (cs), write command (w), read command (r), address (addr), and data signals (among others) from and places interrupt (intr), flag, and data signals (among others) onto the system bus (not shown). The bus interface 14 also receives signals from and sends signals to TDU 18.

The clock generator 16 is operable to receive an external master clock signal (x1) and operable to provide the master clock signal (x1) and one or more internal clock signals (x2, x4, x8) to the components of the active memory. It should be apparent to one skilled in the art that other internal clock signals may be produced by the clock generator 16.

The TDU 18 communicates with the bus interface 14, the HMI 12, the programmable SRAM 24, the array control sequencer 26, and the DCU 20. In the current embodiment, the TDU 18 functions as an interface to allow the host to issue a sequence of commands to the array control sequencer 26 and the DCU 20. Task commands from the host may be buffered in the TDU's FIFO buffers to allow a burst command to be issued. Commands may contain information on how the tasks in the array control sequencer 26 and the DCU 20 should be synchronized with one another, among others.

The DCU 20 arbitrates between the TDU 18 and the HMI 12 and sends commands to the DRAM modules 22 and the processing element array 28. The DCU 20 also schedules refreshes within the DRAM modules 22. In one embodiment, the DRAM modules 22 of the active memory 10 may be comprised of sixteen 64k×128 eDRAM (or embedded DRAM) cores. Each eDRAM core may be connected to an array of sixteen PEs, thus requiring 256 (16×16) PEs in all.

The programmable SRAM 24 functions as a program memory by storing commands issued by the TDU 18. For example, the TDU 18 may transmit a "write program memory address" command which sets up a start address for a write operation and a "write program memory data" command which writes a memory location and increments the program memory write address, among others. The programmable SRAM 24, in the current embodiment, has both an address register and a data output register.

The array control sequencer 26 is comprised of a simple 16 bit minimal instruction set computer (16-MISC). The array control sequencer 26 communicates with the TDU 18, the programmable SRAM 24, and the DCU 20, and is operable to generate register file addresses for the processing element array 28 and operable to sequence the array commands, among others.

The processing element array 28 is comprised of a multitude of processing elements ("PEs") 30 (see FIG. 2) connected in a variety of different arrangements depending on the design requirements for the processing system. For example, processing units may be arranged in hypercubes, butterfly networks, one-dimensional strings/loops, and two-dimensional meshes, among others. The processing element array 28 communicates with the DRAM module 22 and executes commands received from the programmable SRAM 24, the array control sequencer 26, the DCU 20, and the HMI 12. Each PE in the processing element array 28 includes dedicated H-registers for communication with the HMI 12. Control of the H-registers is shared by the HMI 12 and the DCU 20.

Figure 2:
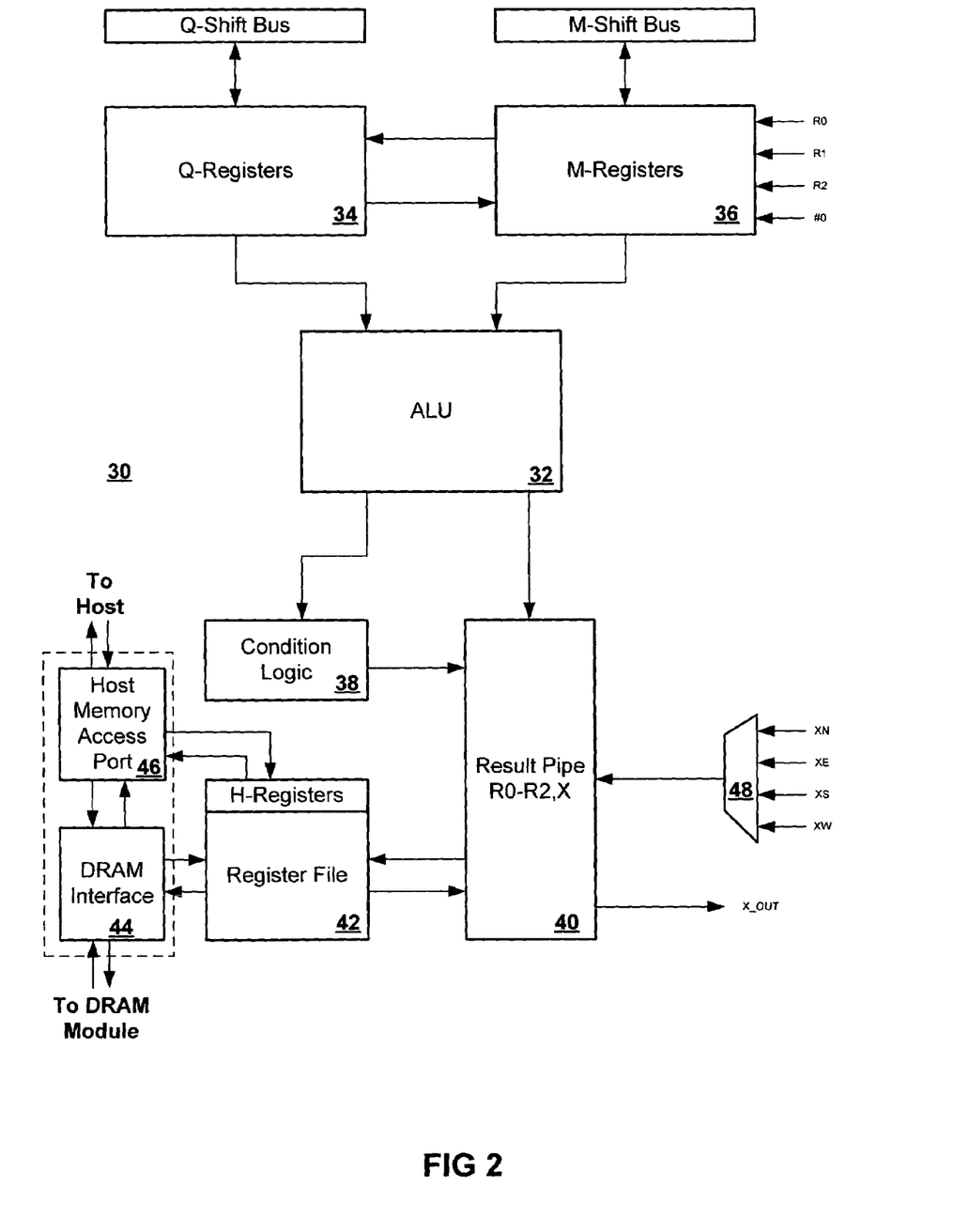
FIG. 2 is a block diagram of a processing element for the active memory illustrated in FIG. 1 according to an embodiment of the present invention.

Referring now to FIG. 2, a block diagram of a PE 30 according to one embodiment of the present invention is illustrated. PE 30 includes an arithmetic logic unit ("ALU") 32, Q-registers 34, M-registers 36, a shift control and condition register 38 (also called "condition logic" 38), a result register pipeline 40, and register file 42. The PE 30 may also contain other components such as multiplexers 48 and logic gates (not shown), among others.

In the current embodiment, the Q-registers 34 are operable to merge data into a floating point format and the M-Registers 36 are operable to de-merge data from a floating point format into a single magnitude plus an exponent format, among others. The ALU 32 includes a multiplier-adder operable (among others) to receive information from the Q-registers 34 and M-registers 36, execute tasks assigned by the TDU 18 (see FIG. 1), and transmit results to the condition logic 38 and to the result register pipeline 40. The result register pipeline 40 is operable to communicate with the register file 42, which holds data for transfer into or out of the DRAM modules 22 via a DRAM interface 44. Data is transferred between the PE and the DRAM module 22 via a pair a registers, one register being responsive to the DCU 20 and the other register being responsive to the PE 30. The DRAM interface 44 receives command information from the DCU 20. The DRAM interface 44 also permits the PE 30 to communicate with the host through the host memory access port 46.

In the current embodiment, the H-registers 42 are comprised of synchronous SRAM and each processing element within the processing element array 28 contains eight H-registers 42 so that two pages can be stored from different DRAM locations, thus allowing the interleaving of short i/o bursts to be more efficient. Result register pipeline 40 is also connected to one or more neighborhood connection registers ("X-register") (not shown). The X-register links one PE 30 to its neighboring PE's 30 in the processing element array 28.

Figure 3:
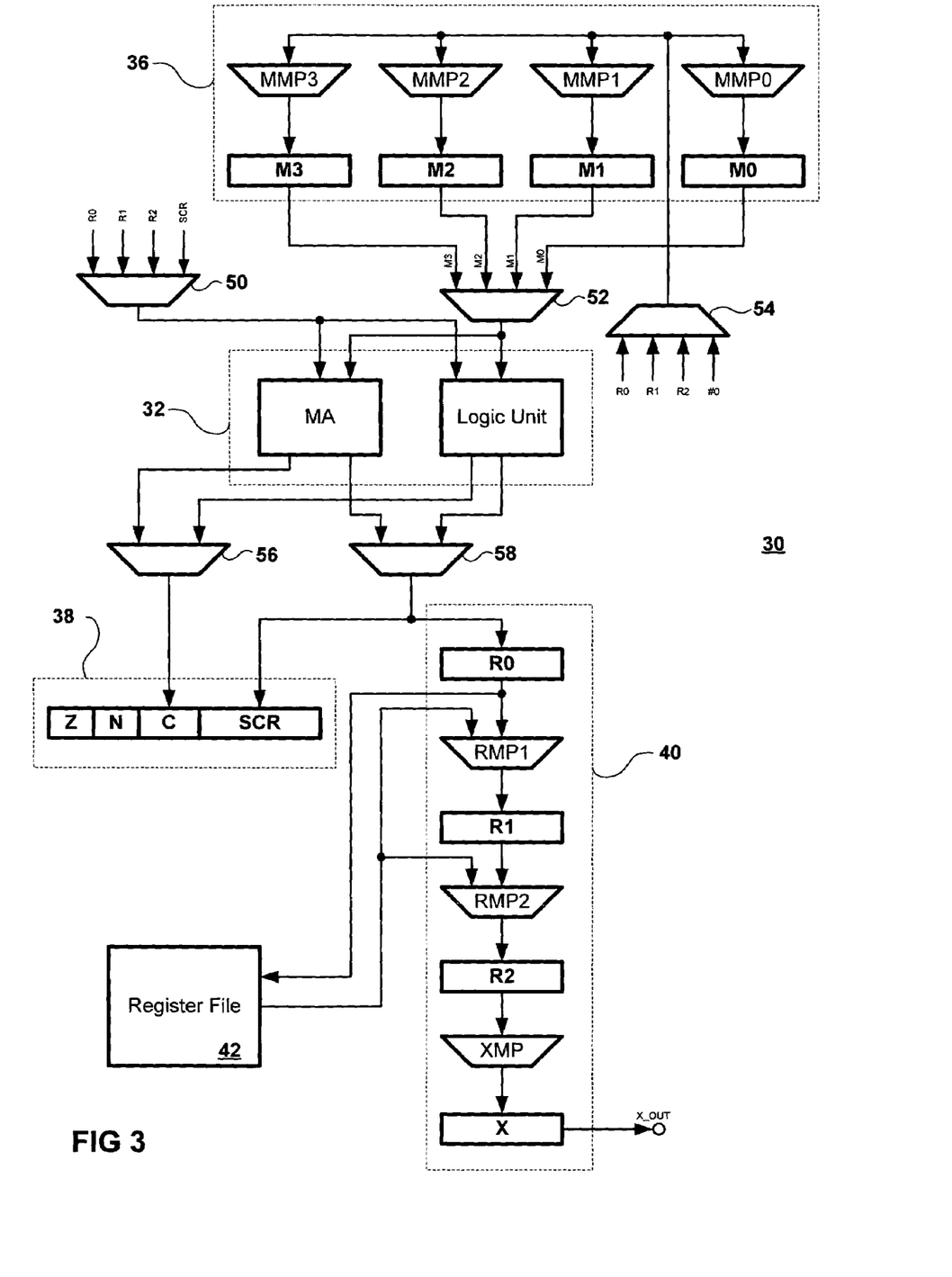
FIG. 3 is a more detailed illustration of the processing elements of FIG. 2 according to an embodiment of the present invention.

FIG. 3 is a more detailed illustration of some components of the processing element of FIG. 2 according to an embodiment of the present invention. For example in FIG. 3, M-registers 36 include four (4) registers M0-M3 each having an associated multiplexer MMP0-MMP3, respectively, which receive signals from, among others, the result pipe 40 via multiplexer 54. The output of registers M0-M3 are connected to ALU 32 via multiplexer 52.

Additionally, result pipe 40 includes four (4) registers R0, R1, R2, and X, as well as several multiplexers (i.e., RMP1, RMP2, XMP). The output of registers R0, R1, and R2 may be sent, for example, to M-registers 36 via multiplexer 54 and to the ALU 32 via multiplexer 50 and multiplexer 52 (connections not shown). It should be noted that multiplexer 50 may also receive the output signals (connections not shown) from Q-registers 34 (not shown) among others.

ALU 32 includes a 16-bit multiplier adder ("MA") and a logic unit, among others. In the current embodiment, the MA is designed to allow twos-compliment addition or subtraction and signed magnitude addition or subtraction. The logic unit is designed to allow logical functions between two arguments such as bit-wise OR and AND functions, among others. Condition logic 38 includes Z, N, and C flag registers, as well as an SCR register. As illustrated, the MA and the logic unit communicate with the C flag register via multiplexer 56 and with the SCR register and the result pipe 40 via multiplexer 58.

It should be noted that the PE illustrated in FIG. 3 has a number of components, signal lines, and connections omitted for clarity. It should be apparent to those skilled in the art that additional components, signal lines, and connections may added while remaining within the scope of the present invention. For example, Q-Registers 34 (as shown in FIG. 2) including registers Q0-Q3 and associated multiplexers QMP0-QMP3, respectively, may be added while remaining within the scope of the present invention. The output of each register Q0-Q3 may be connected to multiplexer 50. Furthermore, it should become apparent to those skilled in the art that, with minor changes, the present invention may be implemented using the Q-registers 34 (among others) instead of M-registers 36 while remaining within the scope of the present invention.

The reader desiring more information about the hardware shown in FIGS. 1-3 is directed to UK Patent application 0221563.0 entitled "Control of Processing Elements in Parallel Processors" filed 17 Sep. 2002, which is hereby incorporated by reference. Details about the PEs may also be found in UK Patent Application No. 021562.2 entitled "Host Memory Interface for a Parallel Processor" filed 17 Sep. 2002, which is hereby incorporated by reference.

Figure 4:
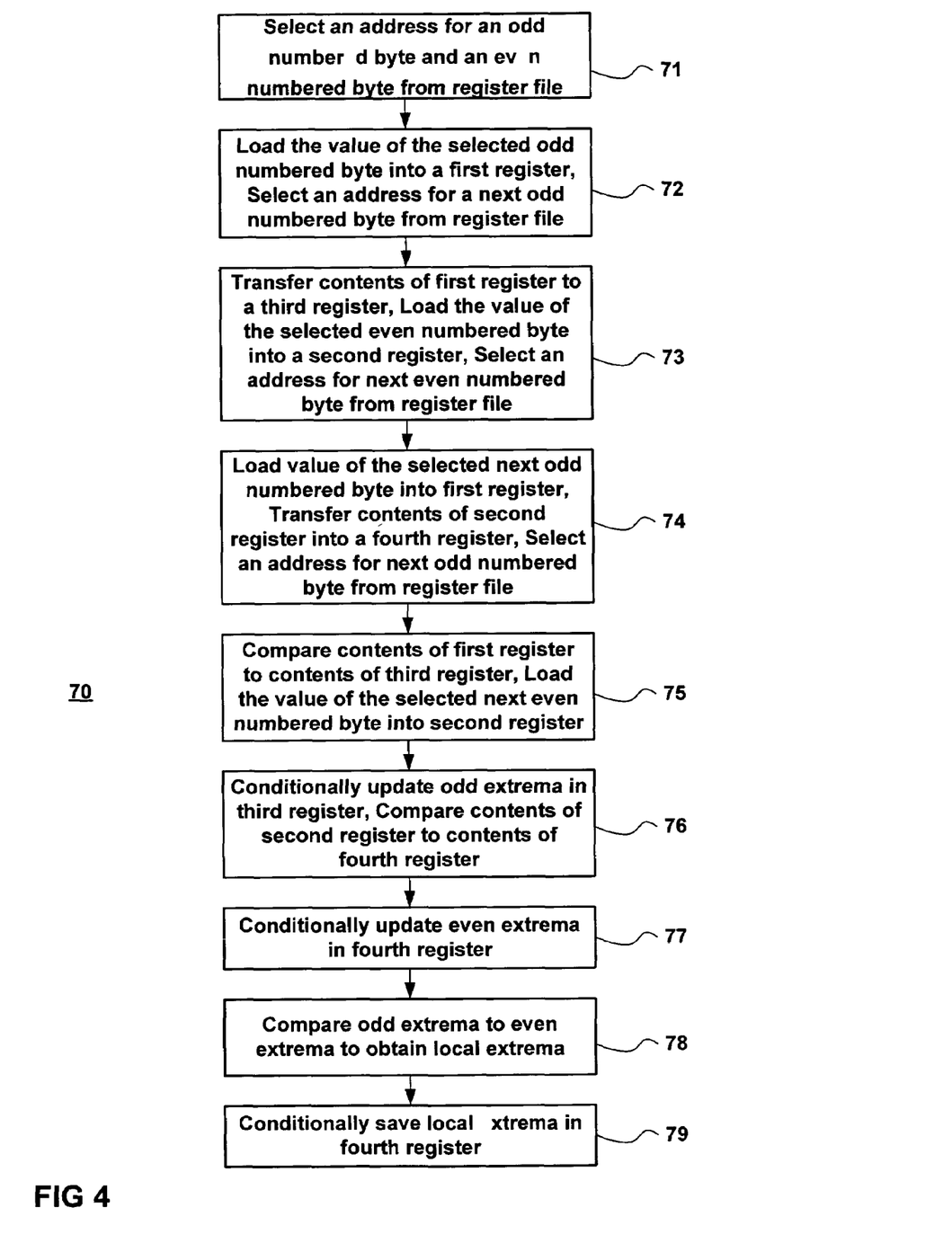
FIG. 4 illustrates an operational process for determining an extrema of set of values on a processing element as illustrated in FIGS. 2 and 3 according to an embodiment of the present invention.

FIG. 4 illustrates an operational process 70 for determining the local extrema of a set of values on a single PE. The position of each value within the value set may be designated as $\{1, 2, 3, 4, \ldots N\}$ and thus, depending on its position within the set, a value may be designated as either "odd numbered" or "even numbered." For example, an "odd numbered value" refers to those values located at an odd numbered position within the value set. For simplicity, the value set $\{4, 10, 8, 9\}$ will be used in conjunction with the discussion of operational process 70 as illustrated in FIG. 4. The odd numbered values in the current embodiment, for example, are values 4 and 8 located at positions 1 and 3, respectively. Similarly, an "even numbered value" refers to those values located at an even numbered position within the value set. The even numbered values in the current embodiment, for example, are values 10 and 9 located at positions 2 and 4, respectively.

It should be noted that in the current embodiment, each value of the set is represented by 8-bits (i.e., 1-byte) of information within the PE and the values, as seen by each PE, are in binary format. However for simplicity, the values are represented in decimal format in the instant discussion. Accordingly, the set may be represented as {byte-1, byte-2, byte-3, byte-4}, where the numerals 1-4 represent each byte's location within the set, thus byte-1=4, byte-2=10, byte-3=8, and byte-4=9.

It should be apparent to one skilled in the art that operational process 70 can be used to find the extrema of a PE having a larger or smaller set of values and that the length of the value may be scaled while remaining within the scope of the current invention.

Operational process 70 begins with operation 71. Operation 71 may be split into sub-operations 71a and 71b. In sub-operation 71a, the first address for an odd numbered value is selected from the register file 42. It should be noted that in the current embodiment, the array control sequencer 26 designates the address within the register file 42 for the selected odd numbered value in increasing order (e.g., from byte-1, byte-3, . . . N), however, another order of selection may be used while remaining within the scope of the present invention. Thus in the current embodiment, the address for byte-1 is selected in sub-operation 71a.

In sub-operation 70b, the first address for an even numbered value is selected from the register file 42. It should be noted that in the current embodiment, the array control sequencer 26 designates the address within the register file 42 for the selected even numbered value in increasing order (e.g., from byte-2, byte-4, . . . N), however, another order of selection may be used while remaining within the scope of the present invention. Thus in the current embodiment, the address for byte-2 is selected in sub-operation 71b.

After operation 71 is completed, the odd numbered value located in the register file 42 at the address location selected in sub-operation 71a is loaded into a first register and the address for the next odd numbered value is selected from the register file 42 in operation 72. It should be noted that the first register may be referred to as the "odd input register" because only odd numbered values (e.g., byte-1, byte-3, byte-5, etc.) are stored within the first register. In the current embodiment, the value for byte-1 (i.e., 4) is loaded into register R1 (i.e., within the result pipe 40) via the multiplexer RMP1 and the address for byte-3 is selected from the register file 42.

After the odd numbered value is loaded into the first register and the address for the next odd numbered value is selected in operation 72, the following three actions take place in operation 73: the odd numbered value is transferred from the first register into a third register, the even numbered value at the address selected in sub-operation 71b is loaded into a second register, and the address for the next even numbered value is selected from the register file 42. The third register is used to store the odd extrema, it is initialized with the first odd value placed into the odd pipeline (e.g., byte-1). It should be noted that the second register may be referred to as the "even input register" because only even numbered values (e.g., byte-2, byte-4, byte-6, etc.) are stored within the second register.

In the current embodiment, the value of byte-1 (i.e., 4) is transferred from register R1 to register M1 via the multiplexer 52 and multiplexer MMP1. The value of byte-2 (i.e., 10) is loaded into register R2 via the multiplexer RMP2. Additionally, the address of byte-4 is selected from register file 42. It should be noted that in the current embodiment, the register M1 is initialized with the value of byte-1 (i.e., 4).

In operation 74, the next odd numbered value is loaded into the first register, the even numbered value is transferred from the second register to the fourth register, and the address for a next odd numbered value is selected from register file 42. The fourth register is used to store the even extrema, it is initialized with the first even value placed into the even pipeline (e.g., byte-2).

In the current embodiment, the value of byte-3 (i.e., 8) is loaded into register R1 via the multiplexer RMP1, the value of byte-2 (i.e., 10) is transferred from register R2 to register M2 via the multiplexer 52 and multiplexer MMP2. It should be noted that in the current embodiment, the register M2 is initialized with the value of byte-2 (i.e., 10).

In operation 75, the value within the first register is compared to the value within the third register to obtain an odd extrema and the next even numbered value is loaded into the second register. The values within the first register and the third register are loaded into the ALU's 32 Multiplier/Adder (MA) and Logic Unit and one value is subtracted from the other. For example in the current embodiment, the MA subtracts the value contained in the third register from the value contained in the first register (here, the value of byte-1 is subtracted from the value of byte-3). If the result is negative (i.e., if the value within the third register is greater than the value within the first register), then flag C in the control logic 38 is set to zero (0). If the result is positive or zero (i.e., the value within the first register is greater than or equal to the value within the third register), then flag C in the control logic 38 is set to one (1).

In the current embodiment for example, the value associated with byte-3 (i.e., 8) which is contained in register R1 and the value associated with byte-1 (i.e., 4) which is contained within register M1 are loaded into the MA, and the value of byte-4 (i.e., 9) is loaded into register R2 via the multiplexer RMP2. The value within M1 is subtracted from the value within R1, thus yielding 8−4=4, a positive value. Accordingly, flag C is set to 1. It should be apparent to those skilled in the art that other types of comparisons may be used while remaining within the scope of the present invention, for example, subtracting the value of byte-3 from the value of byte-1.

In operation 76, the value of the odd extrema is conditionally updated within the third register. The value of flag C determined in operation 75 is used to conditionally update the odd extrema in the third register. For example in the current embodiment, if the largest value on the PE is to be found (i.e., the high extrema), then the value of byte-3 will be loaded into M1 if flag C is equal to one (1), whereas the value of byte-1 will remain in M1 if flag C is equal to zero (0). In this case, register M1 may be referred to as the "odd max register" because the largest odd numbered value that has thus far been found by the process is stored in register M1. On the contrary if the smallest value on the PE is to be found (i.e., the low extrema), then the value of byte-3 will be loaded into M1 if flag C is equal to zero (0), whereas the value of byte-1 will remain in M1 if flag C is equal to one (1). In this case, register M1 may be referred to as the "odd min register" because the smallest odd numbered value that has thus far been found by the process is stored in register M1. In the current embodiment where the high extrema of the set of values within the PE is being determined, then the value of byte-3 (i.e., 8) is stored within register M1 because flag C was set equal to one (1) when byte-1 was subtracted from byte-3.

Additionally in operation 76, the value within the second register is compared to the value within the fourth register to obtain another value for flag C. This new value for flag C will be used to update the values of the even extrema. The values within the second register and the fourth register are loaded into the ALU's 32 Multiplier/Adder (MA) and Logic Unit and one value is subtracted from the other. For example in the current embodiment, the MA subtracts the value contained in the fourth register from the value contained in the second register (here, the value of byte-2 is subtracted from the value of byte-4). If the result is negative (i.e., if the value within the fourth register is greater than the value within the second register), then flag C in the control logic 38 is set to zero (0). If the result is positive or zero (i.e., the value within the second register is greater than or equal to the value within the fourth register), then flag C in the control logic 38 is set to one (1).

In the current embodiment for example, the value associated with byte-4 (i.e., 9) which is contained in register R2 and the value associated with byte-2 (i.e., 10) which is contained within register M2 are loaded into the MA. The value within M2 is subtracted from the value within R2, thus yielding 9−10=−1, a negative value. Accordingly, flag C is set to zero (0). It should be apparent to those skilled in the art that other types of comparisons may be used while remaining within the scope of the present invention, for example, subtracting the value of byte-4 from the value of byte-2.

In operation 77, the value of the even extrema is conditionally updated within the fourth register. The value of flag C determined in operation 76 is used to conditionally update the even extrema in the fourth register. For example if the largest value on the PE is to be found (i.e., the high extrema), then the value of byte-4 will be loaded into M2 if flag C is equal to one (1), whereas the value of byte-2 will remain in M2 if flag C is equal to zero (0). In this case, register M2 may be referred to as the "even max register" because the largest even numbered value that has thus far been found by the process is stored in register M2. On the contrary if the smallest value on the PE is to be found (i.e., the low extrema), then the value of byte-4 will be loaded into M2 if flag C is equal to zero (0), whereas the value of byte-2 will remain in M2 if flag C is equal to one (1). In this case, register M2 may be referred to as the "even min register" because the smallest even numbered value that has thus far been found by the process is stored in register M2. In the current embodiment where the high extrema of the set of values within the PE is being determined, the value of byte-2 (i.e., 10) remains within register M2 because flag C was set equal to zero (0) when byte-2 was subtracted from byte-4.

The above process is repeated until the (odd) extrema of the set of odd numbered values have been found, and the (even) extrema of the set of even numbered values has been found. Then, in operation 78, the local extrema for the PE is found by comparing the odd extrema to the even extrema.

The odd and even extremas, contained within the third and fourth registers, respectively, are loaded into the ALU-MA and one value is subtracted from the other. For example, the even extrema is subtracted from the odd extrema. If the result is negative (i.e., the even extrema is greater than the odd extrema), then flag C in the control logic 48 is set to zero (0). If the result is positive or zero (i.e., the odd extrema is greater than or equal to the even extrema), then flag C in the control logic 48 is set to one (1). In the current embodiment, the odd extrema and even extrema that are compared in operation 78 are the values remaining within registers M1 and M2, respectively. Thus for the set of values {4, 10, 8, 9}, for example, the value of the even extrema (i.e., 10) is subtracted from the value of the odd extrema (i.e., 8), thus yielding 8−10=−2, a negative value. Accordingly, flag C is set to zero (0).

It should be apparent to those skilled in the art that other types of comparisons may be used while remaining within the scope of the present invention, for example, subtracting the value of the odd extrema from the value of the even extrema. Also the input data may be loaded into other registers for the purposes of comparison within the ALU.

In the current embodiment, the odd extrema in M1 is loaded into register R0. The even extrema in M2 is subtracted from R0. A flag C is generated. The flag C is used to conditionally update the value of the fourth register (i.e., M2), which now holds the local extrema.

In operation 79, the value of flag C, as discussed in conjunction with operation 78, is used to conditionally update the value of the local extrema in the fourth register. For example if the largest value on the PE is to be found (i.e., the high extrema), then the odd extrema will be loaded into the fourth register if flag C is equal to one (1), whereas the even extrema will remain in the fourth register if flag C is equal to zero (0). On the contrary if the smallest value on the PE is to be found (i.e., the low extrema), then the odd extrema will be loaded into the fourth register if flag C is equal to zero (0), whereas the even extrema will remain in the fourth register if flag C is equal to one (1). For example in the current embodiment where the high extrema of the set of values within the PE is being determined, then the value of the even extrema (i.e., 10) remains in register M2 because flag C was set equal to zero (0). It should be noted that the local extrema may be returned from register M2 to the register file 42 or sent the X register, among others.

As previously mentioned, the discussion of operational process 70 was limited to finding the local extrema for a PE having a set of only four values (i.e., byte-1 through byte-4). It should be noted, however, that operational process 70 may be scaled for any number of values stored on the PE. For example, FIG. 5 is a graphical representation of the results obtained using operational process 70 for a set of values having greater that four (4) bytes according to an embodiment of the present invention.

Figure 5:
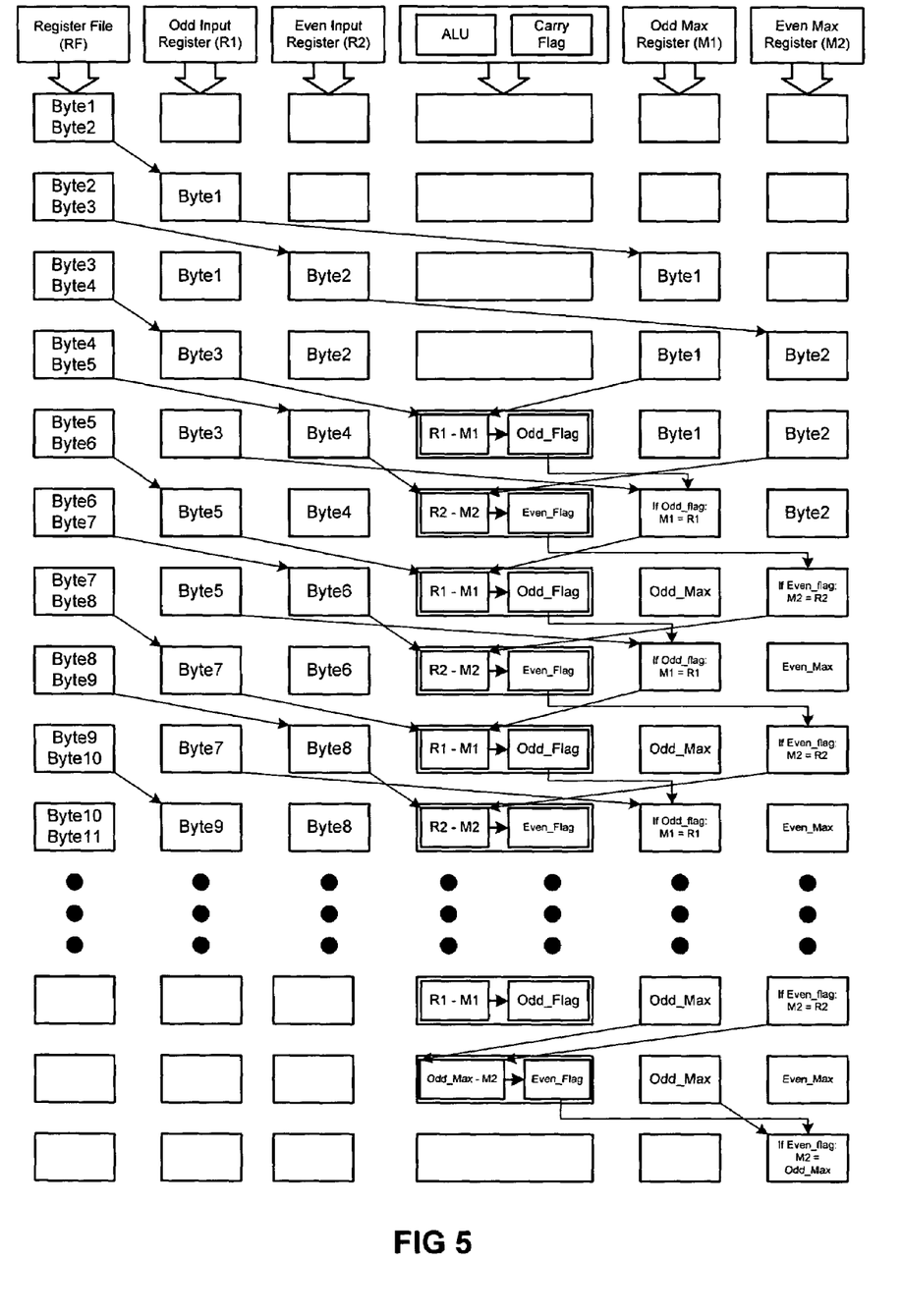
FIG. 5 is a graphical representation of the results of the operational process illustrated in FIG. 4 according to an embodiment of the present invention.

Referring to FIG. 5, it should be noted that each row of the first several rows represent the results obtained using operational process 70 after one cycle, or clock pulse. The first row, for example, represents the results obtained after operation 71 is completed wherein the address for the first odd and even numbered bytes (i.e., byte-1 and byte-2, respectively) is selected from the register file 42. Similarly, the second row represents the results of operation 72 wherein the value of byte-1 is loaded into register R1 and the address for the next odd numbered byte (i.e., byte-3) is selected from the register file 42. Similarly, the third and fourth rows represent the results of operations 73 and 74, respectively.

Referring to the fourth row, in addition to the results discussed above in conjunction with operation 75, the address of the next odd byte in the set (i.e., byte-5) is selected from register file 42 for a PE having more than four values in the set. Likewise referring to the fifth row, in addition to the results discussed above in conjunction with operation 76, the value of byte-4 is loaded into register R2 and the address for the next even byte of the set (i.e., byte-6) is selected from register file 42. Values for each odd and even numbered byte will be alternately fed through the PE. As operational process 70 continues, the value of each subsequent odd numbered byte is compared to the value of the odd extrema that is saved in register M1 and any updated odd extrema is saved back into M1. Additionally, the value of each subsequent even numbered byte is compared to the even extrema that is saved in register M2 and any updated even extrema is saved back into M2. The odd extrema and even extrema are not compared to each other (i.e., as in operation 78) until the extrema for all of the odd bytes in the set and the extrema for all of the even bytes in the set have been finally determined. Thus, operational process 70 can be scaled for any number of bytes within a set.

As discussed above, the length of the value may also be scaled while remaining within the scope of the current invention. For example in an alternative embodiment, operational process 70 is employed for finding the extrema of local shorts, wherein a "short" refers to a 16-bit value. As discussed above, the PE is an 8-bit processing element, thus each short requires two cycles to be processed. In the current alternative embodiment, each short is processed as two separate bytes, a "most significant" MS byte and a "least significant" (LS) byte. The convention used in the current alternative embodiment is known as "big-endian", that is the MS byte is stored in the LS-register file address.

As the shorts are read from the register file (RF), they are separated into the odd and even data streams as discussed above. However, in the current alternative embodiment, both registers M0 and M1 are used to hold a short within the even data stream (LS even byte in M0 and MS even byte in M1) and both registers M2 and M3 are used to hold a short within the odd data stream (LS odd byte in M2 and MS odd byte in M3). Additionally, registers Q0 and Q1 are used to conditionally store the even extrema LS byte and the even extrema MS byte, respectively, and registers Q2 and Q3 are used to conditionally store the odd extrema LS byte and the odd extrema MS byte, respectively.

The shorts are loaded into the ALU and a comparison of the odd extrema LS byte and MS byte to the next odd LS byte and next odd MS byte, respectively, is completed. Likewise, a comparison of the even extrema LS byte and MS byte to the next even LS byte and next even MS byte, respectively, is completed. A comparison of the LS and MS odd extrema bytes to the LS and MS even extrema bytes is then completed to determine a local extrema for the PE.

In the following embodiment, short-1, short-3, etc. form the stream of odd numbered values, and short-2, short-4, etc. form the stream of even numbered values. The movement of the shorts throughout the PE can be divided into a series of clock pulse, or cycles. It should be noted that all operations within a cycle happen simultaneously. Thus if a register is being "read from" and "written to" in the same cycle, the "old" data moves out of the register at the same time that the "new" data moves into the register. Accordingly, the old data is not lost. In the following example, the old contents of a particular register will be that value written to the register during the cycle the immediately preceding the current cycle. If a value was not written to the particular register during the cycle immediately preceding the current cycle, the old contents of the register will be the last value written to the register during the closest preceding cycle to the current cycle. During processing, certain actions take place in each cycle.

In the first cycle, the LS byte of short-1 is loaded into register R1. It should be noted that the "first cycle" assumes that the LS and MS bytes have already been read from the register file.

In the second cycle, the LS byte of short-1 is loaded from register R1 into register M2, and the MS byte of short-1 is loaded into register R1.

In the third cycle, the Q2 register (which holds the LS byte for the odd extrema) is initialized with M2 (the LS byte of the first short for the odd stream), the MS byte of short-1 is loaded from register R1 into register M3, and the LS byte of short-2 is loaded into register R1.

In the fourth cycle, the Q3 register (which holds the MS byte for the odd extrema) is initialized with M3 (the MS byte of the first short for the odd stream), the LS byte of short-2 is loaded from register R1 into register M0, and the MS byte of short-2 is loaded into register R1.

In the fifth cycle, the Q0 register (which holds the LS byte for the even extrema) is initialized with M0 (the LS byte of the first short for the even stream), the MS byte of short-2 is loaded from register R1 into register M1, and the LS byte of short-3 is loaded into R1.

In the sixth cycle, the values of Q2 and R1 are compared, the Q1 register (which holds the MS byte for the even extrema) is initialized with M1 (the MS byte of the first short for the even stream), the LS byte of short-3 is loaded from register R1 into register M2, and the MS byte of short-3 is loaded into R1.

In the seventh cycle, the values of registers Q3 and R1 are compared, the MS byte of short-3 is loaded from register R1 into register M3, and the LS byte of short-4 is loaded into R1.

In the eight cycle, the contents of register Q2 are conditionally updated with M2, the values of Q0 and R1 are compared, the LS byte of short-4 is loaded from register R1 into register M0, and the MS byte of short-4 is loaded into R1.

In the ninth cycle, the contents of register Q3 are conditionally updated with M3, the values of Q1 and R1 are compared, and the MS byte of short-4 is loaded from register R1 into register M1.

In the tenth and eleventh cycles, the contents of registers Q0 and Q1, are conditionally updated with M0 and M1 respectively.

It should be recognized that the above-described embodiments of the invention are intended to be illustrative only. For example, the architecture could be scaled to find the extrema of any sized input value, e.g. 4 byte value ('long'), or 8 byte value ('long long'). Thus, to cope with 8 byte value, the architecture would need to be extended to 16 Q registers and 16 M registers. Numerous alternative embodiments may be devised by those skilled in the art without departing from the scope of the following claims.

What is claimed is:

1. A method of optimizing the operation of a processing element comprising:
    serially loading, on each clock cycle, values in odd positions within a set of values into a first register and values in even positions within said set into a second register;
    determining a series of first extrema from said odd set when values in even positions are being loaded and saving a current value for said first extrema in a third register when a value in an odd position is being loaded;
    determining a series of second extrema from said even set when values in odd positions are being loaded and saving a current value for said second extrema in a fourth register when a value in an even position is being loaded;
    determining a local extrema from values in said third and fourth registers; and
    storing said local extrema.

2. The method of claim 1 wherein said serial loading said set of values comprises:
    loading a value from an odd position within said set into said first register;
    loading a value from an even position within said set into said second register and transferring said value in said first register to said third register;
    loading a value from a next odd position within said set into said first register and transferring said value in said second register to said fourth register; and
    loading a value from a next even position within said set into said second register.

3. The method of claim 2 wherein said determining a first series of extrema from said odd set comprises comparing the value in said first register to the value in said third register.

4. The method of claim 3 wherein said determining further comprises:
    selecting the greater value from said first register and said third register if a high first extrema is desired; and
    selecting the lesser value from said first register and said third register if a low first extrema is desired.

5. The method of claim 2 wherein said determining a second series of extrema from said even set of values comprises comparing the value in said second register to the value in said fourth register.

6. The method of claim 5 wherein said determining further comprises:
selecting the greater value from said second register and said fourth register if a high second extrema is desired; and
selecting the lesser value from said second register and said fourth register if a low second extrema is desired.

7. The method of claim 2 further comprising:
storing a first in said series of second extrema in said fourth register;
loading another value from an even position within said set into said second register;
comparing the value in said second register to the value in said fourth register; and
repeating said storing, loading and comparing steps for remaining values within an even position within said set.

8. The method of claim 1 wherein said determining said local extrema further comprises:
selecting the greater value from said third and fourth registers if a local high extrema is desired; and
selecting the lesser value from said third and fourth registers if a local low extrema is desired.

9. The method of claim 2 further comprising:
storing a first in said series of first extrema in said third register;
loading another value from an odd position within said set into said first register;
comparing the value in said first register to the value in said third register; and
repeating said storing, loading and comparing steps for remaining values within an odd position within said set.

10. The method of claim 1 wherein said determining a series of first extrema from said odd set comprises comparing a least significant byte of a short value from said odd position within said set to a least significant byte of a short value from another odd position within said set and comparing a most significant byte of said short value from said odd position within said set to a most significant byte of said short value from said another odd position within said set.

11. The method of claim 1 wherein said determining a series of second extrema from said even set comprises comparing a least significant byte of a short value from said even position within said set to a least significant byte of a short value from another even position within said set and comparing a most significant byte of said short value from said even position within said set to a most significant byte of said short value from said another even position within said set.

12. A processing element, comprising:
an arithmetic logic unit;
condition logic responsive to said arithmetic logic unit;
a plurality of registers connected to a bus and responsive to said arithmetic logic unit;
a result pipeline responsive to said arithmetic logic unit;
an interface; and
register files connected between said interface and said result pipeline; said processing element configured to:
serially load, on each clock cycle, values in odd positions within a set of values into a first register and values in even positions within said set into a second register;
said arithmetic logic unit determining a series of first extrema from said odd set when values in even positions are being loaded and saving a current value for said first extrema in a third register when a value in an odd position is being loaded;
said arithmetic logic unit determining a series of second extrema from said even set when values in odd positions are being loaded and saving a current value for said second extrema in a fourth register when a value in an even position is being loaded;
said arithmetic logic unit determining a local extrema from values in said third and fourth registers; and
output said local extrema through said result pipeline and said interface.

13. The processing element of claim 12 wherein said arithmetic logic unit is configured to determine a series of first extrema from said odd set by comparing the value in said first register to the value in said third register.

14. The processing element of claim 13 wherein said arithmetic logic unit is configured to:
select the greater value from said first register and said third register if a high first extrema is desired; and
select the lesser value from said first register and said third register if a low first extrema is desired.

15. The processing element of claim 12 wherein said arithmetic logic unit is configured to determining a second series of extrema from said even set of values by comparing the value in said second register to the value in said fourth register.

16. The processing element of claim 15 wherein said arithmetic logic unit is configured to:
select the greater value from said second register and said fourth register if a high second extrema is desired; and
select the lesser value from said second register and said fourth register if a low second extrema is desired.

17. The processing element of claim 12 wherein said arithmetic logic unit is configured to:
select the greater value from said third and fourth registers if a local high extrema is desired; and
select the lesser value from said third and fourth registers if a local low extrema is desired.

18. The processing element of claim 12 wherein the processing element is configured to:
serially load another value from an odd position within said set into said first register;
compare the value in said first register to the value in said third register; and
repeat said storing, loading and comparing steps for remaining values within odd positions within said set.

19. The processing element of claim 12 wherein said processing element is configured to:
serially load another value from an even position within said set into said second register;
comparing the value in said second register to the value in said fourth register; and
repeat said storing, loading and comparing steps for remaining values within even positions within said set.

\* \* \* \* \*